United States Patent
Dooley et al.

(10) Patent No.: US 7,253,548 B2
(45) Date of Patent: Aug. 7, 2007

(54) METHOD AND APPARATUS FOR CONTROLLING AN ELECTRIC MACHINE

(75) Inventors: Kevin Dooley, Mississauga (CA); Michael Dowhan, Milton (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 391 days.

(21) Appl. No.: 10/461,356

(22) Filed: Jun. 16, 2003

(65) Prior Publication Data

US 2004/0251765 A1    Dec. 16, 2004

(51) Int. Cl.
   *H02K 3/48*    (2006.01)
(52) U.S. Cl. ................. 310/214; 310/190; 310/191
(58) Field of Classification Search ............. 310/190, 310/191, 194, 186, 214, 254; 322/50, 49; 361/23
   See application file for complete search history.

(56) References Cited

U.S. PATENT DOCUMENTS

| | | | |
|---|---|---|---|
| 263,136 A * | 8/1882 | Edison | 322/27 |
| 819,933 A * | 5/1906 | Schneider | 310/190 |
| 1,979,665 A * | 11/1934 | Blankenbuehler | 310/190 |
| 2,057,471 A * | 10/1936 | Blankenbuehler | 310/149 |
| 2,058,339 A * | 10/1936 | Metzger | 310/190 |
| 2,227,678 A * | 1/1941 | Stiles | 310/149 |
| 2,264,272 A * | 12/1941 | Blankenbuehler et al. | 310/151 |
| 2,287,929 A * | 6/1942 | Blankenbuehler | 322/6 |
| 2,300,867 A * | 11/1942 | Blankenbuehler | 310/51 |
| 2,378,894 A * | 6/1945 | Blankenbuehler | 322/65 |
| 2,482,526 A * | 9/1949 | Watson et al. | 310/190 |
| 2,610,993 A * | 9/1952 | Stark | 310/154.34 |
| 2,807,772 A * | 9/1957 | Melentine | 310/191 |
| 3,612,929 A * | 10/1971 | Volkrodt | 310/80 |
| 3,673,490 A | 6/1972 | Magrane | |
| 3,707,638 A | 12/1972 | Nailen | |
| 3,753,068 A | 8/1973 | Walker, Jr. | |
| 3,812,441 A | 5/1974 | Sakamoto et al. | |
| 3,961,211 A | 6/1976 | Vergues | |
| 4,004,202 A | 1/1977 | Davis | |
| 4,025,840 A * | 5/1977 | Brissey et al. | 310/214 |
| 4,032,807 A | 6/1977 | Richter | |
| 4,039,910 A | 8/1977 | Chirgwin | |
| 4,186,366 A | 1/1980 | Mc Vey | |
| 4,190,794 A * | 2/1980 | Mikulic | 310/214 |
| 4,237,395 A | 12/1980 | Loudermilk | |
| 4,250,128 A | 2/1981 | Meckling | |

(Continued)

FOREIGN PATENT DOCUMENTS

EP    0 022 379    1/1981

(Continued)

OTHER PUBLICATIONS

PCT International Search Report for International application No. PCT/CA2004/000690 mailed Sep. 16, 2004.

(Continued)

*Primary Examiner*—Thanh Lam
(74) *Attorney, Agent, or Firm*—Ogilvy Renault LLP

(57) ABSTRACT

The invention provides a method and apparatus for controlling a machine in which the magnetic flux emanating from a rotor is selectively diverted to a second path in the stator which bypasses the winding or windings so as to magnetically de-couple the winding or windings from the rotor.

21 Claims, 9 Drawing Sheets

U.S. PATENT DOCUMENTS

| | | | |
|---|---|---|---|
| 4,346,335 A | | 8/1982 | McInnis |
| 4,392,072 A | | 7/1983 | Rosenberry |
| 4,401,906 A | | 8/1983 | Isobe et al. |
| 4,445,061 A | | 4/1984 | Jackson, Jr. |
| 4,492,902 A | | 1/1985 | Ficken et al. |
| 4,503,377 A | | 3/1985 | Kitabayashi et al. |
| 4,511,831 A | | 4/1985 | McInnis |
| 4,547,713 A | | 10/1985 | Langley et al. |
| 4,562,399 A | | 12/1985 | Fisher |
| 4,605,874 A | | 8/1986 | Whiteley |
| 4,617,726 A | | 10/1986 | Denk |
| 4,625,135 A | | 11/1986 | Kasabian |
| 4,638,201 A | | 1/1987 | Feigel |
| 4,641,080 A | * | 2/1987 | Glennon et al. ............... 322/49 |
| 4,681,729 A | | 7/1987 | Pendleton et al. |
| 4,694,654 A | * | 9/1987 | Kawamura ............ 310/156.53 |
| 4,709,180 A | | 11/1987 | Denk |
| 4,763,034 A | | 8/1988 | Gamble |
| 4,799,578 A | | 1/1989 | Matsushita |
| 4,852,245 A | | 8/1989 | Denk |
| 4,885,493 A | | 12/1989 | Gokhale |
| 4,887,020 A | | 12/1989 | Graham |
| 4,896,756 A | | 1/1990 | Matsushita |
| 4,897,570 A | | 1/1990 | Ishikawa et al. |
| 4,924,125 A | | 5/1990 | Clark |
| 4,929,922 A | | 5/1990 | Hollweck |
| 5,015,905 A | * | 5/1991 | Koharagi et al. ........... 310/186 |
| 5,030,877 A | | 7/1991 | Denk |
| 5,184,040 A | | 2/1993 | Lim |
| 5,235,231 A | | 8/1993 | Hisey |
| 5,304,883 A | | 4/1994 | Denk |
| 5,397,948 A | | 3/1995 | Zoerner et al. |
| 5,430,362 A | * | 7/1995 | Carr et al. .................. 318/779 |
| 5,519,275 A | | 5/1996 | Scott et al. |
| 5,555,722 A | | 9/1996 | Mehr-Ayin et al. |
| 5,585,682 A | | 12/1996 | Konicek et al. |
| 5,737,164 A | * | 4/1998 | Ferreira et al. ............... 361/31 |
| 5,742,106 A | | 4/1998 | Muraji |
| 5,770,901 A | | 6/1998 | Niimi et al. |
| 5,793,137 A | | 8/1998 | Smith |
| 5,793,178 A | | 8/1998 | Biais |
| 5,798,596 A | | 8/1998 | Lordo |
| 5,822,150 A | | 10/1998 | Kelsic |
| 5,825,597 A | | 10/1998 | Young |
| 5,831,507 A | | 11/1998 | Kasamatsu et al. |
| 5,834,874 A | | 11/1998 | Krueger et al. |
| 5,838,080 A | | 11/1998 | Couderchon et al. |
| 5,903,115 A | | 5/1999 | Taylor |
| 5,912,522 A | | 6/1999 | Rivera |
| 5,917,248 A | | 6/1999 | Seguchi et al. |
| 5,925,999 A | | 7/1999 | Lakerdas et al. |
| 5,936,325 A | | 8/1999 | Permuy |
| 5,942,829 A | | 8/1999 | Huynh |
| 5,952,757 A | | 9/1999 | Boyd, Jr. |
| 5,953,491 A | | 9/1999 | Sears et al. |
| 5,955,809 A | | 9/1999 | Shah |
| 5,962,938 A | | 10/1999 | Bobay et al. |
| 6,020,711 A | * | 2/2000 | Rubertus et al. ............ 318/701 |
| 6,031,311 A | | 2/2000 | Lee |
| 6,097,124 A | | 8/2000 | Rao et al. |
| 6,100,620 A | | 8/2000 | Radovsky |
| 6,114,784 A | | 9/2000 | Nakano |
| 6,239,532 B1 | | 5/2001 | Hollenbeck et al. |
| 6,242,840 B1 | | 6/2001 | Denk et al. |
| 6,255,756 B1 | | 7/2001 | Richter |
| 6,265,801 B1 | | 7/2001 | Hashiba et al. |
| 6,271,613 B1 | | 8/2001 | Akemakou et al. |
| 6,286,199 B1 | | 9/2001 | Bobay et al. |
| 6,313,560 B1 | * | 11/2001 | Dooley ....................... 310/259 |
| 6,323,625 B1 | | 11/2001 | Bhargava |
| 6,342,746 B1 | | 1/2002 | Flynn |
| 6,373,162 B1 | | 4/2002 | Liang et al. |
| 6,429,615 B2 | | 8/2002 | Schmider et al. |
| 6,437,529 B1 | | 8/2002 | Brown |
| 6,504,261 B2 | | 1/2003 | Fogarty et al. |
| 6,525,504 B1 | | 2/2003 | Nygren et al. |
| 6,541,887 B2 | | 4/2003 | Kawamura |
| 2002/0047477 A1 | | 4/2002 | Dooley |
| 2002/0084705 A1 | | 7/2002 | Kawamura |
| 2002/0084715 A1 | | 7/2002 | Kakuta et al. |
| 2002/0093252 A1 | | 7/2002 | Kang et al. |
| 2002/0096960 A1 | | 7/2002 | Tong et al. |
| 2002/0149281 A1 | | 10/2002 | Saint-Michel et al. |

FOREIGN PATENT DOCUMENTS

| | | |
|---|---|---|
| EP | 368930 | 4/1994 |
| EP | 754365 | 2/1998 |
| EP | 750806 | 8/1998 |
| EP | 0 881 744 A2 | 12/1998 |
| EP | 0 932 246 A2 | 7/1999 |
| FR | 1555855 | 12/1968 |
| FR | 2618616 | 7/1987 |
| JP | 03107343 A * | 5/1991 |
| JP | 7-123621 | 6/1995 |
| WO | 99/09638 | 2/1999 |
| WO | 99/66624 | 12/1999 |
| WO | 02/09260 | 1/2002 |
| WO | 03/003546 | 1/2003 |
| WO | 03/028202 | 4/2003 |

OTHER PUBLICATIONS

General Electric Company, "150Kva Samarium Cobalt VSCF Starter/Generator Electrical System, Final Technical Report", 1979.

M. Cronin, "The All-Electric Airplane as Energy Efficient Transport", SAE Journal, 1980.

Richter, E. et al., "Jet Engine Integrated Generator", Amcn Inst. Aeronautics & Astronautics, 1981.

B. Dishner et al., "A Novel Electromechanical Approach to Constant Frequency Power Generation", IEEE Journal, 1989.

M. Cronin, "The All-Electric Airplane Revisited", SAE Technical Series, 1989.

SAE Technical Paper Series 892252, Application Considerations for Integral Gas Turbine Electric Starter/Generator revisited. 1989.

The Applicability of Electrically Driven Accessories for Turboshaft Engines, 1993.

R. Nims, "Development of an Oilless, Gearless, and Bleedable Under Armour Power Unit", ASME paper, 1995.

Ricther et al., "Preliminary Design of an Internal Starter/Generator for Application in the F110-129 Engine", SAE Aerospace Atlantic Conference, 1995.

R. Nims, "Armor-plated auxiliary power", Mechanical Engineering, 1997.

PCT International Search Report, PCT/CA2004/000408, Mailed Aug. 30, 2004.

* cited by examiner

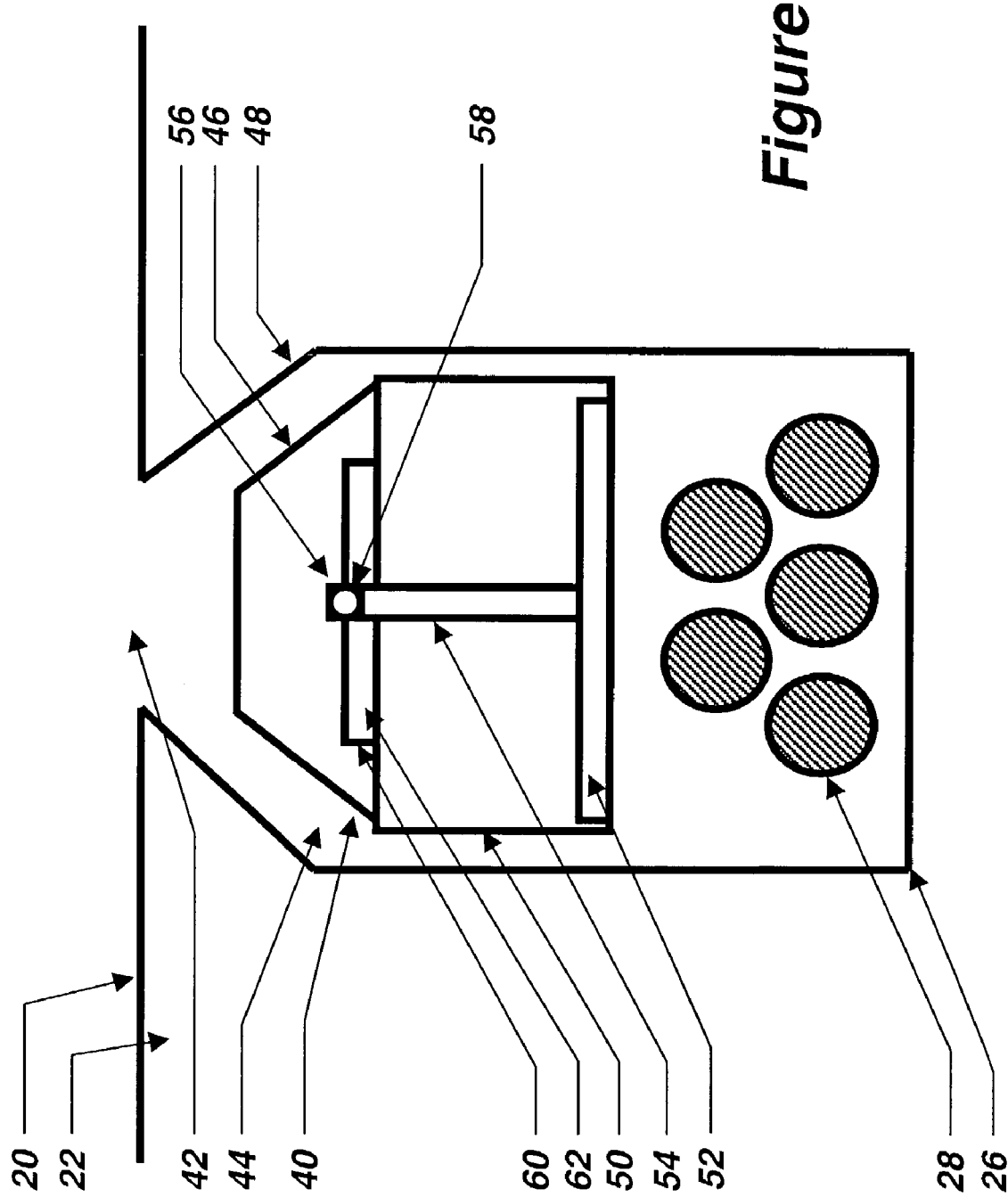

METHOD AND APPARATUS FOR CONTROLLING AN ELECTRIC MACHINE

TECHNICAL FIELD

The invention relates to an electric machine and, in particular, to the control of such machines.

BACKGROUND OF THE ART

Controlling electric machines, such as motors and generators, in fault conditions is important to providing a safe and controllable machine. Some types of machines, by reason of their architecture, are inherently more difficult to control. For example, a permanent magnet alternator which is continuously driven while suffering an internal short-circuit in its windings can present a particular concern, especially in high power applications. Consequently, the prior art presents many solutions to the control of electric machines in short-circuit situations.

The prior art shows both electrical/electronic and mechanical means for responding to or preventing electric machine internal faults. One example of a mechanical solution in presented in U.S. Pat. No. 4,641,080 to Glennon et al., in which the stator of a permanent magnet generator is divided into two semi circular halves which, in the event of a detected fault, are opened by an actuator motor to increase the air gap between the stator and the rotor. Increasing the gap reduces the magnetic flux in the stator and thereby prevents burn out in the windings. The mechanisms involved, however are complex, expensive and present reliability issues to the designer. An improved solution is therefore desired, and it is an object of this invention to provide improved solutions to the problem of electric machine control.

SUMMARY OF THE INVENTION

The present invention may be used advantageously to control an electric machine upon the occurrence of an internal short circuit in the machine or its associated control circuitry. The invention may also be used to control the machine in other circumstances, such as a loss of coolant, over-temperature, or other fault or non-fault situations.

In one aspect the invention provides a method of operating an electricity generating machine, the machine having a rotor, stator and at least one winding disposed in at least one slot in the stator, the method comprising the steps of circulating magnetic flux along a first magnetic path through the stator to thereby induce an output voltage and current in the at least one winding, interposing a member across the at least one slot to provide a second magnetic path through the stator, the second path bypassing the at least one winding such that magnetic flux circulating along the second magnetic path induces substantially no voltage in the at least one winding, and diverting said magnetic flux from the first path to the second path.

In another aspect, the present invention provides a method of operating an electric machine, the machine having a rotor, a stator and at least one winding disposed in the stator, the method comprising the steps of circulating magnetic flux along a first path in the stator, the first path at least partially encircling the at least one winding such that, when magnetic flux is circulated along the first path, the at least one winding is magnetically coupled to the rotor and selectively diverting the magnetic flux to a second path in the stator, the second path bypassing the at least one winding such that, when magnetic flux is circulated along the second path, the at least one winding become magnetically de-coupled from the rotor.

In another aspect, the present invention provides a method of operating an electric machine, the machine having a rotor adjacent a stator assembly, the stator assembly having at least one slot and at least one winding in the slot, the slot defining a slot gap, the method comprising the steps of moving the rotor to generate electricity in the at least one winding, and moving at least a piece of the stator assembly to substantially close the slot gap and thereby provide a low reluctance path for guiding rotor magnetic flux away from the at least one winding and thereby substantially deactivating the at least one winding In another aspect, the present invention provides a method of controllably generating electricity, the method comprising the steps of guiding magnetic flux along a first path around an electrical conductor to induce a voltage in the winding and then selectively guiding said magnetic flux along a second path to substantially reduce said voltage induced in the electrical conductor.

In another aspect, the present invention provides an electric machine comprising a magnetic rotor, a stator having a face adjacent the rotor, the stator including at least one slot defined therein and at least one winding disposed in the at least one slot, the at least one slot defining a slot gap across the at least one slot, wherein the at least one slot at least partially defines a primary magnetic circuit in the stator, the primary magnetic circuit having a reluctance and extending around the at least one slot, and a member moveable between a first and second position, the member substantially bridging the slot gap when in the second position to substantially close the slot gap and thereby close a second magnetic circuit in the stator, the second magnetic circuit bypassing a portion of the at least one slot containing the at least one winding, the second magnetic circuit having a reluctance not greater than the primary magnetic circuit reluctance.

In another aspect, the present invention provides an electric machine comprising a magnetic rotor, and a stator defining at least part of a primary magnetic circuit and a secondary magnetic circuit therein, the primary magnetic circuit adapted to guide magnetic flux emanating from the rotor around at least one winding to induce a voltage in the winding, the secondary magnetic circuit adapted to guide said magnetic flux emanating from the rotor substantially along a stator surface adjacent the rotor to thereby bypass the at least one winding, wherein the secondary magnetic circuit is selectively closeable, and wherein the secondary magnetic circuit has a reluctance not greater than a reluctance of the primary magnetic circuit.

DESCRIPTION OF THE DRAWINGS

In order that the invention may be readily understood, several embodiments of the invention are illustrated by way of example in the accompanying drawings, in which:

FIG. 9 is similar to FIG. 4, showing an alternate configuration for the invention.

Details of the invention and its advantages will be apparent from the detailed description included below.

DETAILED DESCRIPTION OF PREFERRED EMBODIMENTS

Figure 1:
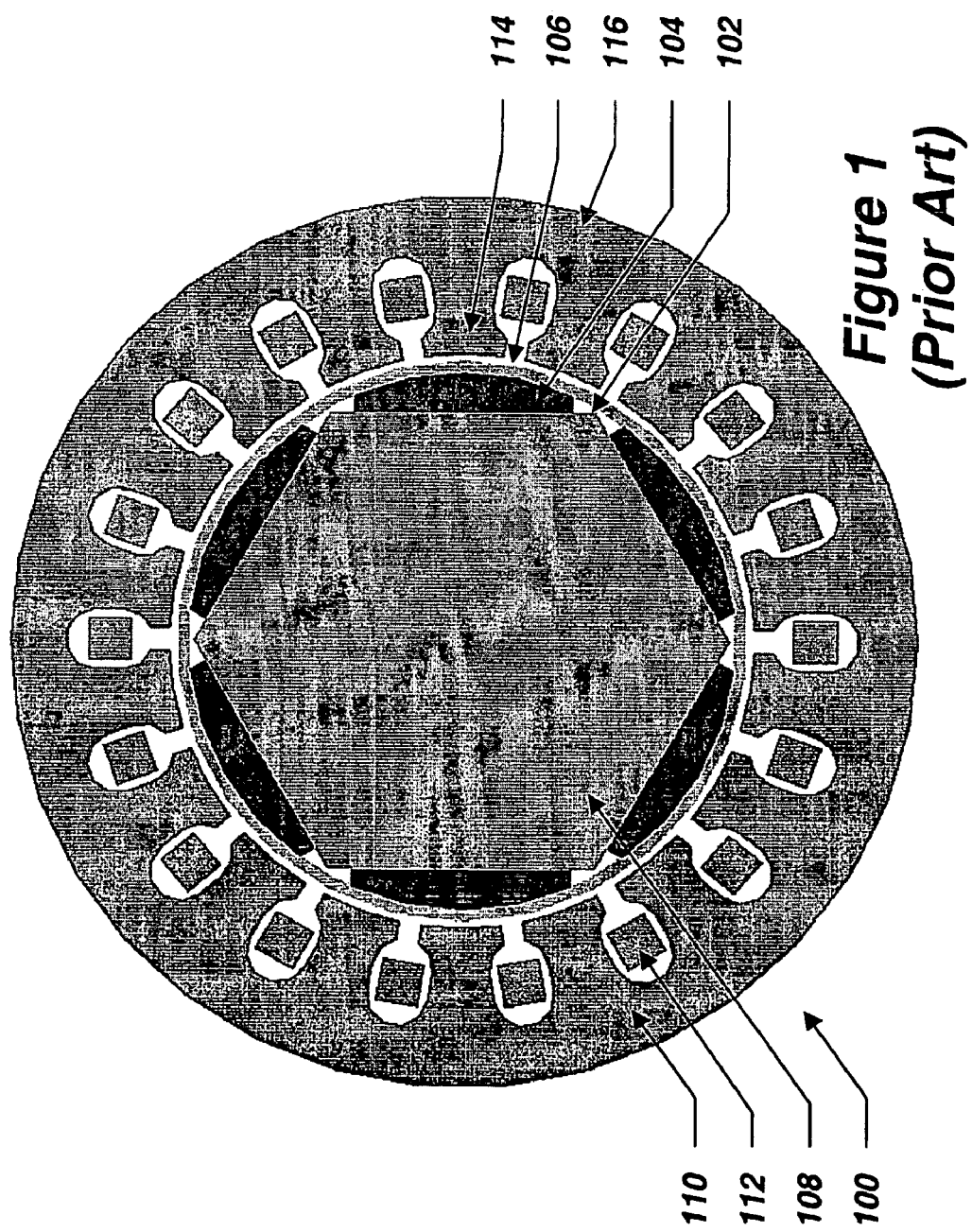
FIG. 1 is a cross-sectional view of a permanent magnet electric machine according to the prior art.

A typical prior art machine configuration will first be examined, in order to permit a comparison with the present invention described later below. FIG. 1 shows a typical permanent magnet (PM) machine 100 according to the prior art, which has a rotor 102, with permanent magnets 104 mounted thereto by a retaining ring 106, which is mounted on a rotatable shaft 108. Rotor 102 is adjacent a stator 110 having a plurality of windings 112 interspersed between a plurality of teeth 114 mounted to a back iron 116. An "inside rotor" configuration is shown in FIG. 1, but the positions of the rotor and stator may also be reversed. As is well understood, PM machine 100 may operate in a generator/alternator mode or a motor mode. When operated in a generator/alternator mode, an external torque source forces rotation of the shaft (and thus the rotor and the magnets), and the interaction of the magnets and the windings causes a magnetic flux to loop the windings in the slots. As the rotor rotates, the magnetic flux in the stator structure changes, and this changing flux results in generation of voltage in the windings, which results in an output current that can be used to power electrical devices, or be stored for later use.

Figure 2:
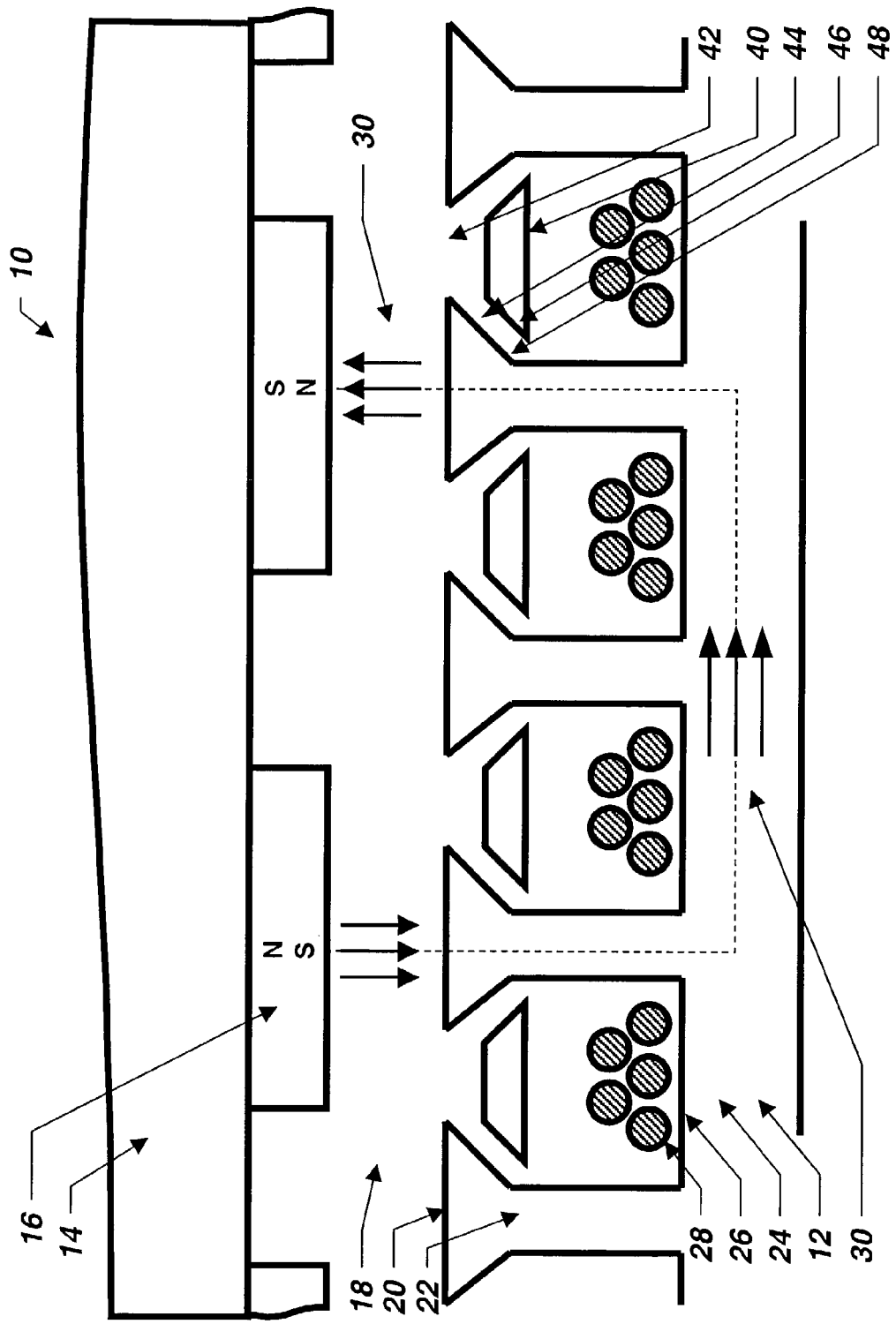
FIG. 2 is an enlarged partial sectional schematic view of a machine rotor and stator incorporating the present invention, the invention shown in the 'open' position.

Referring to FIGS. 2-8, the present invention will now be described. FIG. 2 shows an electric machine 10, generally similar to machine 100, is shown schematically with the rotor and stator 'flattened' for convenience, having a stator 12 and rotor 14. Rotor 14 has a plurality of permanent magnets 16 and is separated from stator 12 by an rotor air gap 18. Stator 12 has a rotor face surface 20 and includes a plurality of teeth 22 extending from a back iron portion 24 to thereby define a plurality of slots 26 for housing winding or windings 28. As will be described in better detail below, stator 12 defines a primary magnetic flux path 30, for guiding magnetic flux from rotor 12 through teeth 22 and back iron 24, and around winding(s) 28. Retaining means may be required for magnets 16, depending on machine design, but for clarity, none are shown here.

The present invention also includes a 'gate' member 40 configured to substantially close, and preferably intimately close, a stator slot gap 42 between adjacent teeth 22 in stator 12. Gate 40 is moveable between at least a first or 'open' position (FIG. 1) and a second or 'closed' position (FIG. 2), as will be described in more detail below. In the 'open' position, a gate gap 44 separates faces 46 and 48, which are preferably mating faces. In the 'closed' position, gate 40 and teeth 22 form a second path 32 which may be used to guide magnetic flux through stator 12, as will be described in more detail below.

The means by which gate 40 is moved is not shown in FIGS. 2 and 3, but is shown and depicted in more detail later in this specification. Also not shown is a control means for determining when the gate is to be actuated for movement between its open and closed positions. Such control means preferably includes a fault sensor, such as an appropriate temperature or current sensor, but may comprise any suitable means of determining when gate 40 is to move, and any suitable means for signaling, releasing or activating a movement mechanism for gate 40.

Machine 10 is preferably generally constructed of known materials. The gate member 40 is manufactured preferably from a high magnetic permeability material such as silicon iron or similar suitable materials common to the industry. The gate material is preferably of lower reluctance (or higher permeability) material than the material forming the primary magnetic path in the stator, thereby optimizing the functioning of the invention as described in more detail below.

In use, under 'normal' machine operating conditions (i.e. rotor 14 id driven for the purpose of generating electricity using machine 10), the gate is positioned in its 'open' position (i.e. FIG. 2) and, when there, preferably has a negligible effect on the operation of machine 10. As rotor 12 passes adjacent stator 12, magnetic flux from magnets 16 is guided down tooth/teeth 22, through back iron 24 and back up tooth/teeth 22 to a successive magnet 14, and thus magnetic flux circulates along primary magnetic circuit path 30, around windings 28, and thereby induces voltage in windings 28 which may be used to generate an output current from windings 28 and, as well, machine 10.

Figure 3:
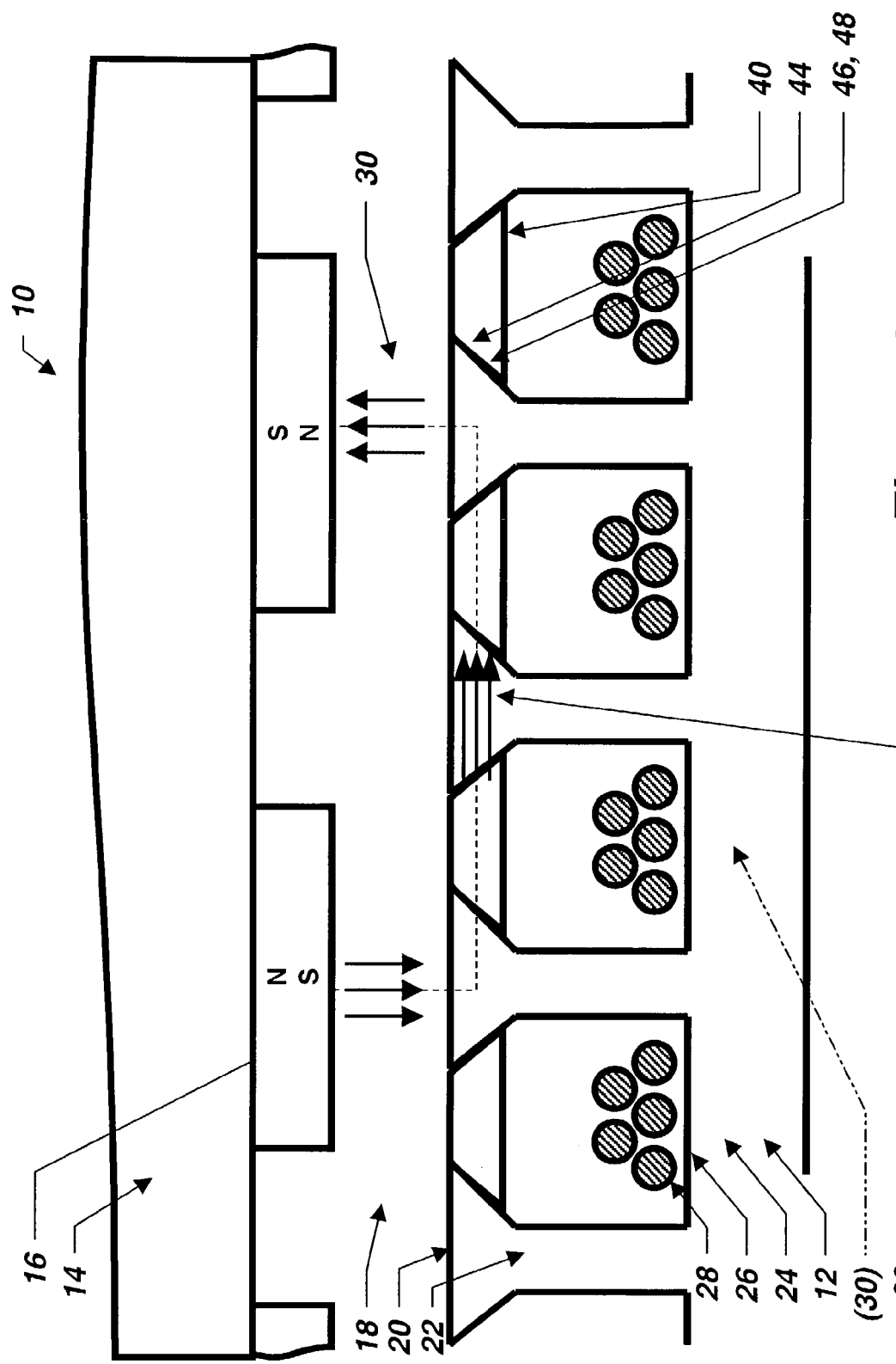
FIG. 3 is an enlarged partial sectional schematic view of the device of FIG. 2, shown in the 'closed' position.

Referring to FIG. 3, upon the appropriate condition (e.g. upon reaching a threshold temperature, or upon receiving the appropriate command from a sensor sensing an internal fault condition, etc.), gate 40 is moved upward and into contact with the stator teeth 22, and preferably contact is intimate along faces 46 and 48, thereby substantially completely closing gate gap 44 and, thereby, slot gap 42. Gate 40 thus forms a new, second magnetic circuit path 32 for guiding magnetic flux in the stator. Since the second flux path 32 preferably has a lower reluctance than the primary magnetic circuit path 30 (i.e. it is an 'easier' path for the magnetic flux to follow), the majority of the magnetic flux will bypass the generating path 30 and the windings 28 when the gate is in the 'closed' position. Therefore, when the gate 40 is closed, magnetic flux in the stator will be guided such there is preferably no or negligible voltage induced in windings 28. The machine 10 may be in this manner 'shut down' or 'turned down' to control the machine 10 in specific circumstances, such as an internal fault or short circuit in a winding 28, or another fault such as over-heating in the machine, etc. Preferably, gates 40 are individually closeable, to thereby permit a selective activation of the gate elements of the present invention. In this manner, specifically located internal faults in the machine may be individually isolated without substantially disrupting the normal operation of the remainder of the machine.

The present invention provides for a shutdown capability which may be activated in a much faster way than the prior art, and need not be activated by temperature or the exceedance of a threshold current. It could be activated for any control purposes, and may even be manually (i.e. non-automatically) actuated, if desired. The gate is preferably a wedge-shaped component, as depicted, but need not necessarily be so. The faces 46 and 48 may be stepped, curvilinear or straight, and are preferably intimately mating to reduce the overall reluctance of the secondary path. The gate 40 is preferably located in the slot of the stator assembly when in its 'open' position but, again, but need not necessarily be so.

A benefit of the present invention is that, when the gate is in the 'closed' position, the machine windings become encircled by a relatively high permeability material, which has the effect of multiplying the 'self' or 'leakage' inductance of the winding which, in turn, causes a significant increase in the impedance of the winding. This thereby beneficially significantly reduces the short circuit current value in the machine winding, adding yet another element of increased safety to the machine. The present invention has many applications and is particularly suited to, among many other things, use in an electric machine 10 used as an starter/generator in an aircraft prime mover gas turbine engine 70 (see FIG. 8).

Figure 4:
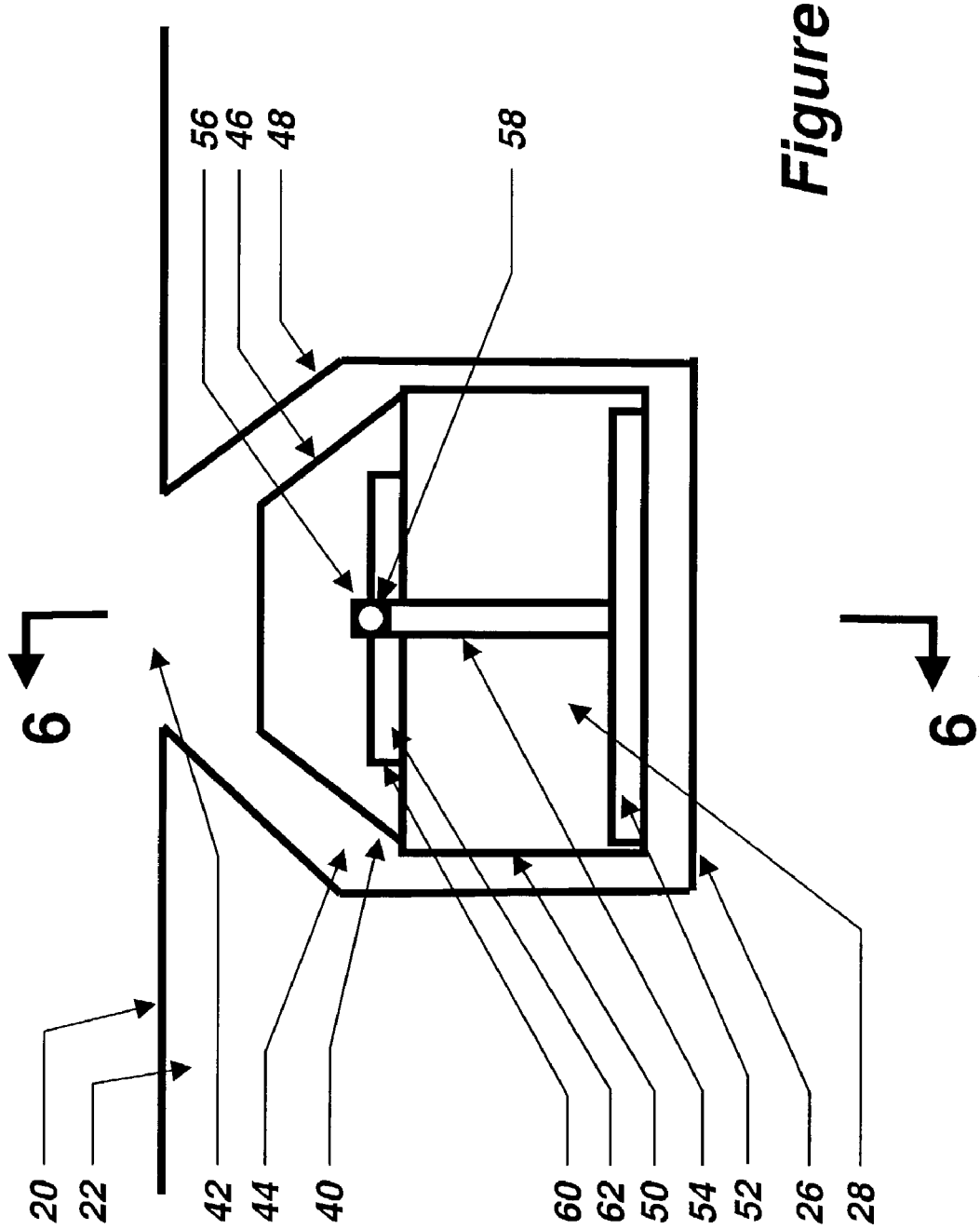
FIG. 4 is a further enlarged cross-sectional view of another embodiment of the present invention, the invention shown in the 'open' position.
Figure 5:
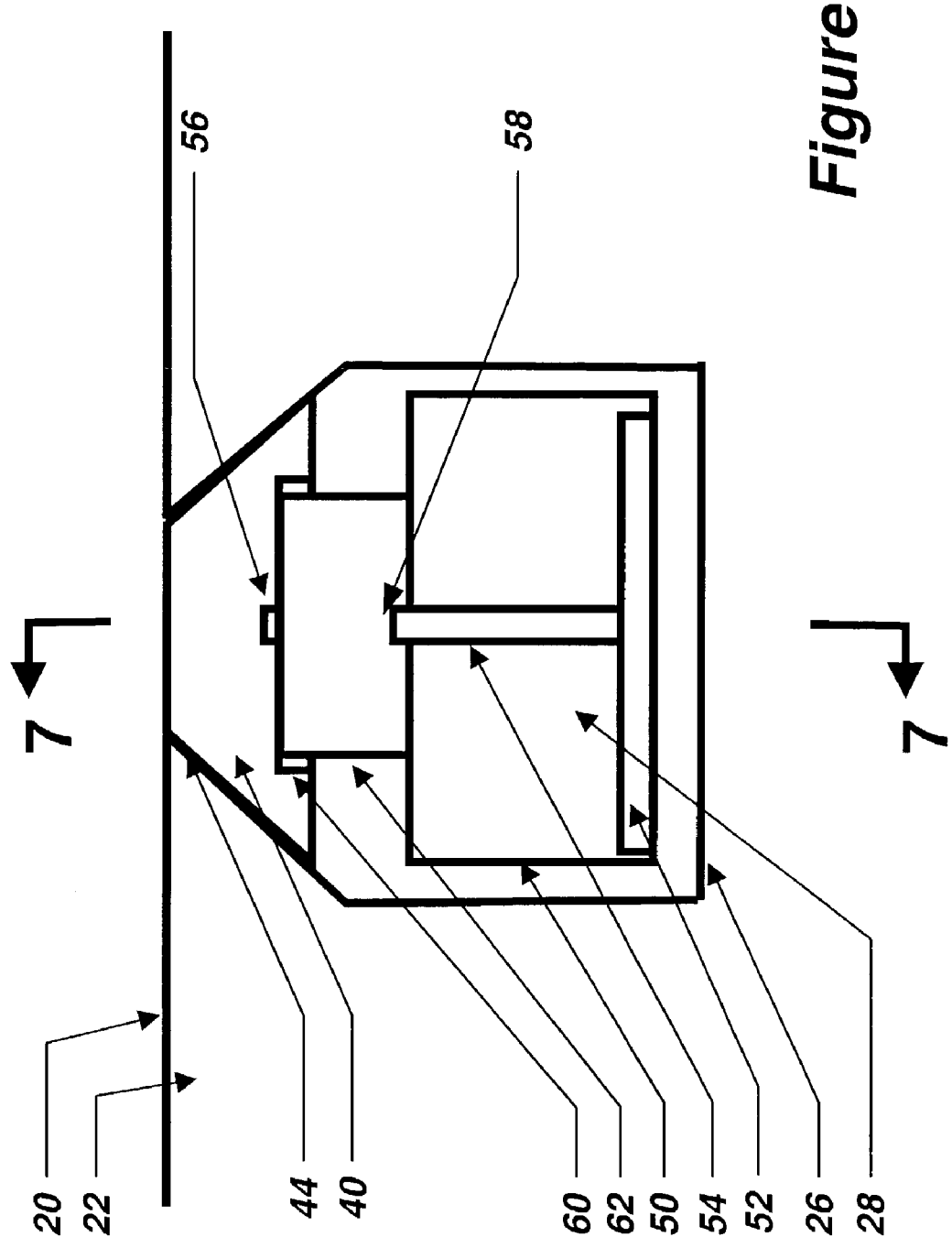
FIG. 5 shows the device of FIG. 4 in the 'closed' position.
Figure 6:
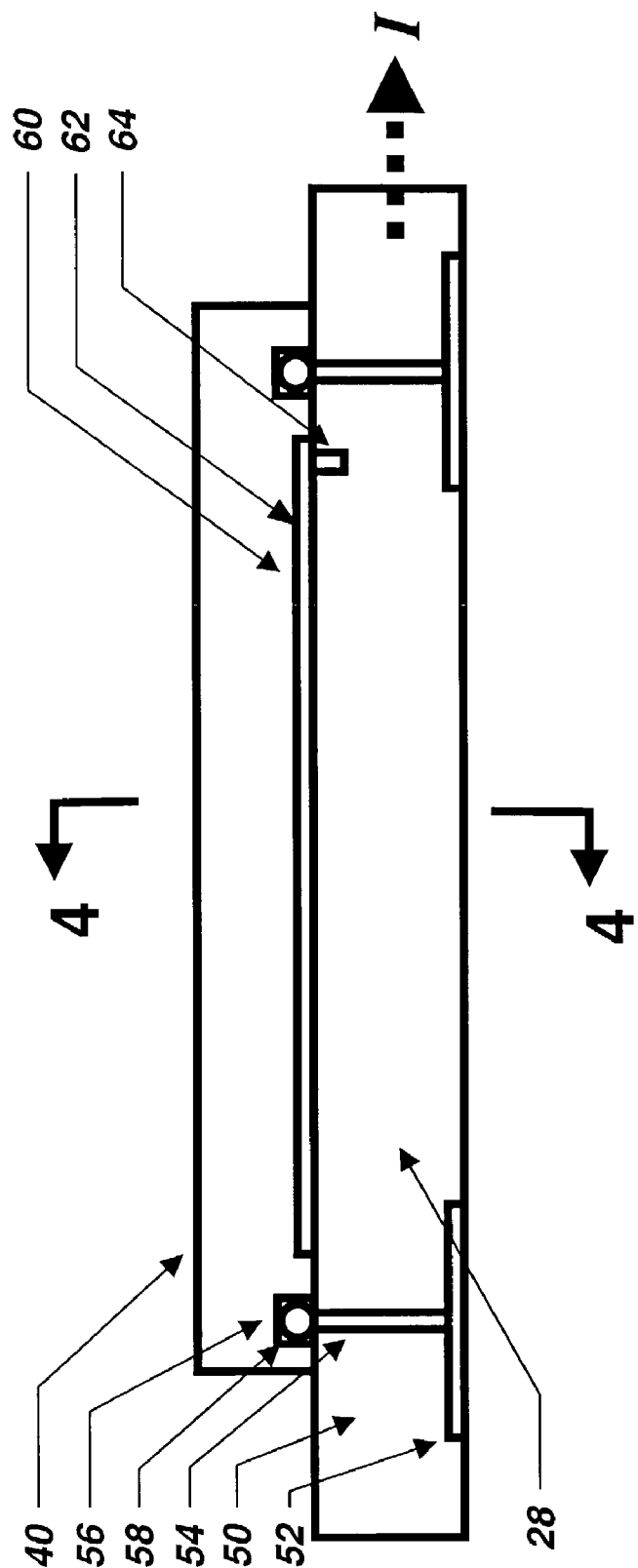
FIG. 6 is an axial sectional view of the device of FIG. 4, shown in the 'open' position.

Referring to FIGS. 4-7, an apparatus for automatically actuating the present invention is shown. Referring to FIG. 4, gate 40 is supported on winding 28, in this case a single copper conductor, which thereby also forms a support 50 and pinned to support plate 52 by a plurality of pins 54. Gate 40 is held to pins 54 in a slot 56 and brazed therein by a braze 58 selected and configured to melt above a chosen temperature limit to thereby permit automatic deployment (as described below) of gate 40 once the threshold temperature is exceeded. An example of suitable alloy for braze 58 is a gold eutectic alloy with a melting range of 600° F. to 625° F. Referring to FIG. 6, a slot 60 is provided between gate 40 and support 50 for retaining a leaf spring 62, which is preferably slidably mounted to support 50 by a pin 64. (The arrow I indicates the direction of current flow through the winding 28).

Figure 7:
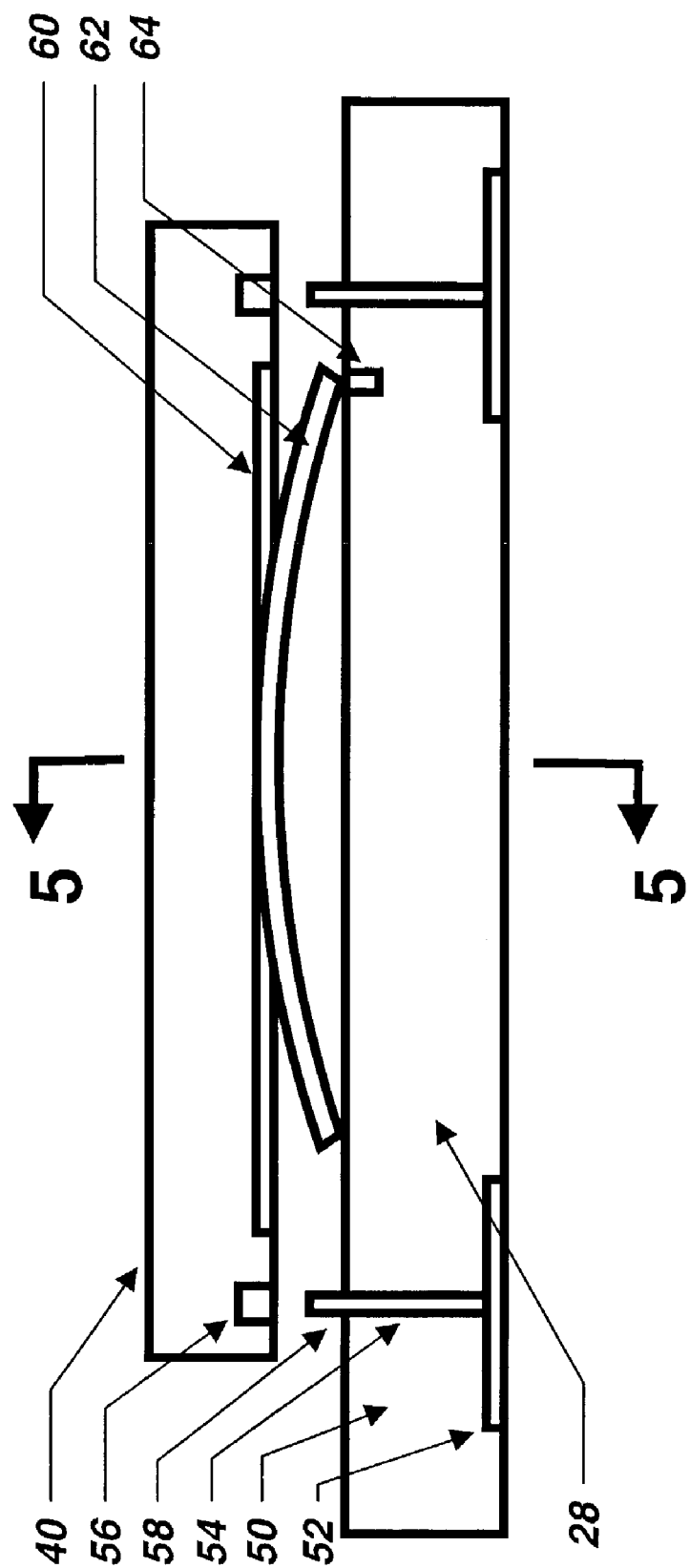
FIG. 7 is an axial sectional view of the device of FIG. 4, shown in the 'closed' position.
Figure 8:
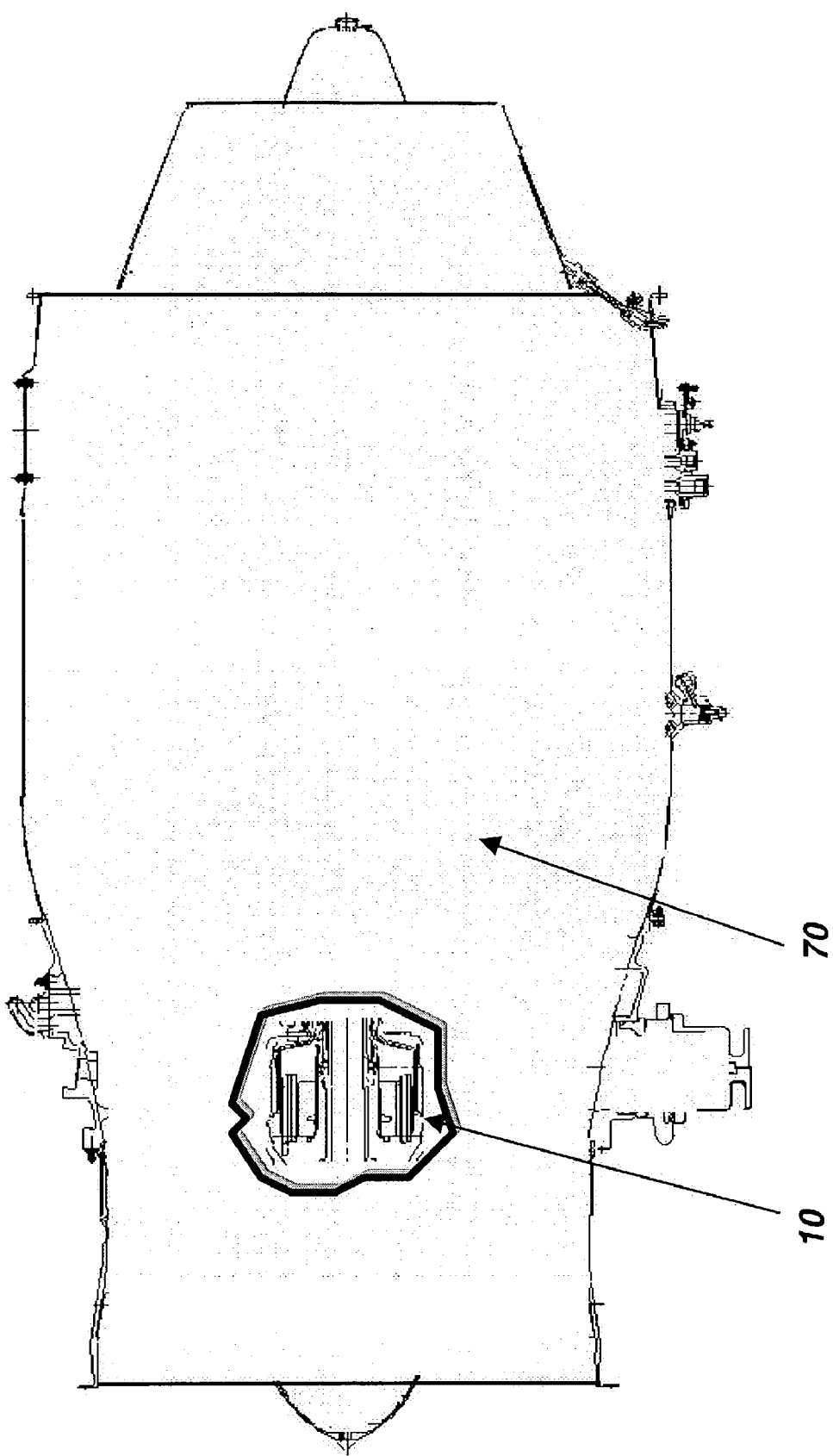
FIG. 8 shows an example application of an electric machine incorporating the present invention.

Referring to FIGS. 5 and 7, in use, when the machine heats up (e.g. due to local or general short circuit current in the windings, or an unwanted over-temperature situation), braze joint 58 will melt thereby releasing pins 54 from slots 56. Support 50 preferably also helps conduct heat in machine 10 to braze joint 58 so that the joint is in good thermal communication with at least the stator slot. Spring 62 thereby biases gate 40 towards its 'closed' position to close gate 40 as desired. Preferably, spring 62 will move gate 40 at least about 0.060", to thereby permit the 'open' position of gate 40 to be sufficiently far away from teeth 22 (i.e. to provide a gate gap 44 large enough) to prevent unwanted circulation of magnetic flux through the secondary magnetic circuit 32 when the gate 40 is in the 'open' position. The leaf spring stiffness is chosen, among other things, to overcome the surface tension of the melted braze to ensure release and movement of gate 40. Once release, gate 40 will also naturally be attracted to the teeth 22 of the stator 12 due to the action of the magnetic flux from the rotor 14.

It will be understood that it is preferable that the braze release mechanism of the present invention is actuated by the heating of winding 28/support 50 before the risk of fire or significant damage to machine 10 occurs. The independent nature of this particular actuation means for gate 40 makes it possible for one phase conductor (i.e. the winding in one slot) to have actuated gate 40 while the remaining phases (i.e. slots) are not shutdown (i.e. some useful power is still produced).

The motion of the gate can be achieved in a number of different ways. For example, support 50 itself may thermally expands sufficiently to close the gate gap 44. Alternately, another type of spring or other biasing means may be provided. The motion required between the 'open' and 'closed' positions of the gate may be as small as about 0.060", depending on the machine design, but may be smaller or larger, as will be understood by the skilled person in light of a review of this disclosure.

The above description is meant to be exemplary only, and one skilled in the art will recognize that many changes may be made to the embodiments described without departing from the scope of the invention disclosed. For example, the machine may be single or multi-phase, single or multi-channel. The windings may have single or multi turns per slot. A variety of winding types may be used (squirrel cage, lap, etc.), and the windings may be any conductor(s) (i.e. single conductor, more than one wire, insulated, laminated, etc.) or may be superconductors. The winding(s) 28 need not be integral with the mechanism support structure 50, but may be separate features as shown in FIG. 9, with support 50 held appropriately within the slot preferably so as not to interfere with the operation of windings 28. In multiphase machine, there may be zigzag, delta, or Y-connected windings in accordance with known techniques. The rotor can be electromagnetic (i.e. permanent magnet not necessary), and may be provided in an outside or inside configuration, or any other suitable configuration.

Therefore, although the above description relates to specific preferred embodiments as presently contemplated by the inventors, it will be understood that the invention in its broad aspect includes mechanical and functional equivalents of the elements described herein.

We claim:

1. A method of operating an electricity generating machine, the machine having a rotor, stator and at least one winding disposed in at least one slot in the stator, the method comprising the steps of:
    circulating magnetic flux along a first magnetic path through the stator to thereby induce an output voltage and current in the at least one winding; and then,
    upon the occurrence of an internal fault in the machine, interposing a member across the at least one slot to provide a second magnetic path through the stator, the second path bypassing the at least one winding such that magnetic flux circulating along the second magnetic path induces substantially no voltage in the at least one winding; and
    diverting said magnetic flux from the first path to the second path.

2. The method of claim 1 wherein the step of interposing comprises moving the member radially into said interposed position across the at least one slot.

3. The method of claim 1 further comprising the step of sensing a temperature in the machine, and wherein the step of interposing the member is performed when the sensed temperature exceeds a threshold value.

4. The method of claim 3 wherein the threshold value corresponds to the occurrence of a short circuit in the machine.

5. The method of claim 1 wherein the step of circulating magnetic flux along the first path includes the step of rotating a permanent magnet rotor.

6. The method of claim 5 wherein the rotor is rotated by a gas turbine engine.

7. The method of claim 1 wherein the member forms a portion of the second magnetic path.

8. The method of claim 1 wherein the step of interposing and the step of diverting are accomplished simultaneously.

9. The method of claim 8 wherein the step of diverting is achieved by the performance of the step of interposing the member.

10. The method of claim 1 wherein the second magnetic path is provided along a surface of the stator facing the rotor.

11. A method of operating an electric machine, the machine having a rotor, a stator and at least one winding disposed in the stator, the method comprising the steps of:
    circulating magnetic flux along a first path in the stator, the first path at least partially encircling the at least one winding such that, when magnetic flux is circulated along the first path, the at least one winding is magnetically coupled to the rotor;

sensing a temperature in the machine; and then upon the occurrence of an internal fault in the machine detected when the sensed temperature exceeds a selected threshold, selectively diverting the magnetic flux to a second path in the stator, the second path bypassing the at least one winding such that, when magnetic flux is circulated along the second path, the at least one winding become magnetically de-coupled from the rotor.

12. The method of claim 11 wherein the selected threshold corresponds to the occurrence of a short circuit in the machine.

13. The method of claim 11 wherein the step of circulating magnetic flux along the first path includes the step of rotating a permanent magnet rotor.

14. The method of claim 13 wherein the rotor is rotated by a gas turbine engine.

15. A method of operating an electric machine, the machine having a rotor, a stator and at least one winding disposed in the stator, the method comprising the steps of:

circulating magnetic flux along a first path in the stator, the first path at least partially encircling the at least one winding such that, when magnetic flux is circulated along the first path, the at least one winding is magnetically coupled to the rotor and then upon the occurrence of an internal fault in the machine, lowering the reluctance of a second path in the stator to selectively divert the magnetic flux to the second path, the second path bypassing the at least one winding such that, when magnetic flux is circulated along the second path, the at least one winding become magnetically de-coupled from the rotor.

16. The method of claim 15 wherein the second path reluctance is lowered to a reluctance less than a reluctance of the first path.

17. A method of operating an electric machine, the machine having a rotor, a stator and at least one winding disposed in the stator, the method comprising the steps of:

circulating magnetic flux along a first path in the stator, the first path at least partially encircling the at least one winding such that, when magnetic flux is circulated along the first path, the at least one winding is magnetically coupled to the rotor; and then upon the occurrence of an internal fault in the machine, moving a stator member to selectively divert the magnetic flux to a second path in the stator, the second path bypassing the at least one winding such that, when magnetic flux is circulated along the second path, the at least one winding become magnetically de-coupled from the rotor.

18. The method of claim 17 wherein the member is moved to close a gap in the stator, the member thereby forming a portion of the second path.

19. The method of claim 11 wherein the second path is provided along a surface of the stator facing the rotor.

20. A method of operating an electric machine, the machine having a rotor adjacent a stator assembly, the stator assembly having at least one slot and at least one winding in the slot, the slot defining a slot gap, the method comprising the steps of:

moving the rotor to generate electricity in the at least one winding, and then upon the occurrence of an internal short circuit in at least one of the machine and its associated control circuitry, moving at least a piece of the stator assembly to substantially close the slot gap and thereby provide a low reluctance path for guiding rotor magnetic flux away from the at least one winding and thereby substantially deactivating the at least one winding.

21. The method of claim 20, wherein the at least a piece of the stator assembly is moved radially relative to the rotor.

* * * * *